(12) United States Patent
Ma

(10) Patent No.: US 12,546,404 B2
(45) Date of Patent: Feb. 10, 2026

(54) MULTI-PASSAGE VALVE

(71) Applicant: Illinois Tool Works Inc., Glenview, IL (US)

(72) Inventor: Yue Ma, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/093,882

(22) Filed: Jan. 6, 2023

(65) Prior Publication Data

US 2023/0220918 A1 Jul. 13, 2023

(30) Foreign Application Priority Data

Jan. 13, 2022 (CN) .......................... 202210038843.5
Dec. 15, 2022 (CN) ......................... 202211612864.X

(51) Int. Cl.
*F16K 11/085* (2006.01)
*F16K 5/04* (2006.01)
*F16K 27/06* (2006.01)

(52) U.S. Cl.
CPC ........ *F16K 11/0856* (2013.01); *F16K 5/0464* (2013.01); *F16K 27/065* (2013.01); *Y10T 137/86863* (2015.04)

(58) Field of Classification Search
CPC ............ F16K 11/0853; F16K 11/0856; F16K 27/065; F16K 27/12; F16K 5/0457;
(Continued)

(56) References Cited

U.S. PATENT DOCUMENTS 5,816,290 A * 10/1998 Altshuler .............. F16K 11/085
137/625.47
11,085,548 B2 8/2021 Ikemoto
(Continued)

FOREIGN PATENT DOCUMENTS

CN 215487806 U 1/2022
EP 2713083 A1 4/2014
(Continued)

OTHER PUBLICATIONS

The extended European search report for Application No. 23151350. 8, dated Jun. 9, 2023, European Patent Office, Germany (8 pages).
(Continued)

*Primary Examiner* — Kenneth Rinehart
*Assistant Examiner* — Jonathan J Waddy
(74) *Attorney, Agent, or Firm* — McAndrews, Held & Malloy, Ltd.

(57) ABSTRACT

The present disclosure provides a multi-passage valve including a housing, a valve element, and a sealing element. The valve element is rotatably disposed inside the housing around an axis, and has at least two regions on an outer side thereof. The regions are arranged in a direction of rotation of the valve element, and each extends in an axial direction of the valve element and has a plurality of connecting passages. The sealing element extends by a distance around the valve element, keeps in contact with an outer surface of the valve element, and is provided with a plurality of openings which communicate with the outside. One of the regions is capable of being covered by the sealing element by rotating the valve element to form an operating region, each of the connecting passages in the operating region being capable of connecting at least two of the openings.

18 Claims, 9 Drawing Sheets

(58) Field of Classification Search
CPC .... F16K 5/0464; F16K 5/0471; F16K 5/0478; B60H 1/00485; B60K 11/02; Y10T 137/86863
USPC .................................................. 137/625.47
See application file for complete search history.

(56) References Cited

U.S. PATENT DOCUMENTS

| | | | | |
|---|---|---|---|---|
| 2002/0079003 | A1* | 6/2002 | Scampini | F16K 5/0407 137/625.32 |
| 2007/0251582 | A1* | 11/2007 | Farkh | B60H 1/00485 137/455 |
| 2009/0095154 | A1* | 4/2009 | Barone | B01D 53/0476 137/625.46 |
| 2018/0292016 | A1* | 10/2018 | Ledvora | F16K 5/0471 |
| 2018/0372235 | A1* | 12/2018 | Smith | F16K 27/065 |
| 2020/0197961 | A1* | 6/2020 | Zhang | F16K 11/085 |
| 2021/0131575 | A1* | 5/2021 | Bunda | F16K 11/0856 |
| 2022/0316607 | A1* | 10/2022 | Surve | F16K 27/065 |
| 2022/0316608 | A1* | 10/2022 | Tiemeyer | F16K 27/065 |
| 2023/0332697 | A1* | 10/2023 | Hu | F16K 11/0853 |
| 2023/0332699 | A1* | 10/2023 | Lin | F01P 7/165 |
| 2024/0117885 | A1* | 4/2024 | Feng | F16K 27/06 |

FOREIGN PATENT DOCUMENTS

| | | |
|---|---|---|
| EP | 4212763 A1 | 7/2023 |
| WO | 2022268193 A1 | 12/2022 |

OTHER PUBLICATIONS

Communication pursuant to Article 94(3) EPC for European Application No. 23151350.8, dated Sep. 27, 2024, European Patent Office, Netherlands (3 pages).

* cited by examiner

MULTI-PASSAGE VALVE

RELATED APPLICATIONS

The present application claims the benefit of Chinese Patent Application Nos. 202210038843.5, filed Jan. 13, 2022, and 202211612864.X, filed Dec. 15, 2022, each titled "Multi-Passage Valve," the contents of which are hereby incorporated by reference.

FIELD

The present disclosure relates to a multi-passage valve, and in particular to a multi-passage valve for a thermal management system inside a vehicle.

BACKGROUND

The temperature of components (such as a battery, a motor) inside a vehicle needs to be controlled within a preset range, so that the components have a good operation performance. Therefore, there is a need for a thermal management system for regulating the temperature of the components. Moreover, in a system capable of realizing various functions, since it is required that fluid in pipelines flow along different paths in different modes, a multi-passage valve enabling switching between the paths for the fluid in the pipelines is required.

The multi-passage valve generally includes a housing and a valve element disposed inside the housing, the housing being provided with housing openings, the valve element being provided with connecting passages. When the valve element rotates at a certain position, an opening in the housing is aligned with a connecting passage on the valve element, so that corresponding pipelines can be connected.

SUMMARY

The present disclosure relates generally to a multi-passage valve, substantially as illustrated by and described in connection with at least one of the figures, as set forth more completely in the claims.

DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
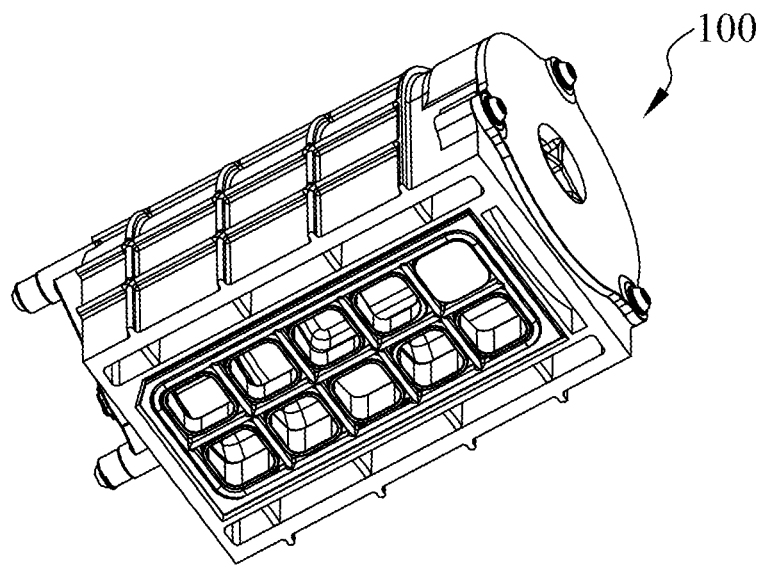
FIG. 1A is a perspective view of a multi-passage valve according to an embodiment of the present disclosure.

Various specific implementations of the present disclosure will be described below with reference to the accompanying drawings which constitute part of this description. It is to be understood that although the terms indicating orientations, such as "front", "rear", "upper", "lower", "left", "right", "top" and "bottom", are used in the present disclosure to describe orientations of structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are merely illustrative and should not be considered as limitations. If possible, the same or similar reference numerals used in the present disclosure refer to the same components.

The present disclosure provides a multi-passage valve, including: a housing, a valve element and a sealing element. The housing defines a housing cavity and is provided with a communicating portion which connects the housing cavity to the outside. The valve element is rotatably disposed inside the housing cavity around an axis, the valve element has at least two regions on an outer side thereof, the at least two regions are arranged in a direction of rotation of the valve element, and each of the regions extends in an axial direction of the valve element and has a plurality of connecting passages. The sealing element is disposed at the communicating portion of the housing, extends by a distance around the valve element and keeps in contact with an outer surface of the valve element, and the sealing element is provided with a plurality of openings which communicate with the outside through the communicating portion. One of the at least two regions is capable of being covered by the sealing element by means of rotating the valve element to form an operating region, each of the plurality of connecting passages in the operating region being capable of connecting at least two of the plurality of openings.

According to the multi-passage valve as described above, the multi-passage valve has at least two operating modes, and is capable of switching between different operating modes by selecting a different region of the at least two regions of the valve element as the operating region.

According to the multi-passage valve as described above, the housing is provided with a housing opening forming the communicating portion.

According to the multi-passage valve as described above, the sealing element is arranged in the housing opening and is held in place by edges of the housing opening.

According to the multi-passage valve as described above, an outer contour of the valve element is cylindrical, the at least two regions are arranged in a circumferential direction of the valve element, and each of the regions is uniformly distributed in the circumferential direction.

According to the multi-passage valve as described above, an extension of the sealing element in the circumferential direction of the valve element does not exceed an extension of two adjacent regions; and the sealing element is generally in the shape of a strip and has a pair of length sides, the pair of length sides are arranged in the axial direction of the valve element.

According to the multi-passage valve as described above, the sealing element has a first axial sealing portion and a second axial sealing portion, and a separation portion is provided between adjacent regions of the at least two regions of the valve element, the separation portion being capable of abutting with the first axial sealing portion and the second axial sealing portion.

According to the multi-passage valve as described above, each of the plurality of connecting passages of the valve element is formed by a recess or a hollowed-out portion.

According to the multi-passage valve as described above, each of the plurality of connecting passages of the valve element is applied in only one operating mode, and each of the plurality of connecting passages is disposed separately from other connecting passages.

According to the multi-passage valve as described above, the multi-passage valve is used for a thermal management system of a vehicle.

The sealing element of the multi-passage valve in the present disclosure is in contact with only a part of the valve element in the circumferential direction, which can reduce a friction force of the valve element during rotation.

The concept, specific structures and resulting technical effects of the present disclosure are further described below with respect to the accompanying drawings so as to enable those skilled in the art to fully understand the objective, features and effects of the present disclosure.

Figure 1B:
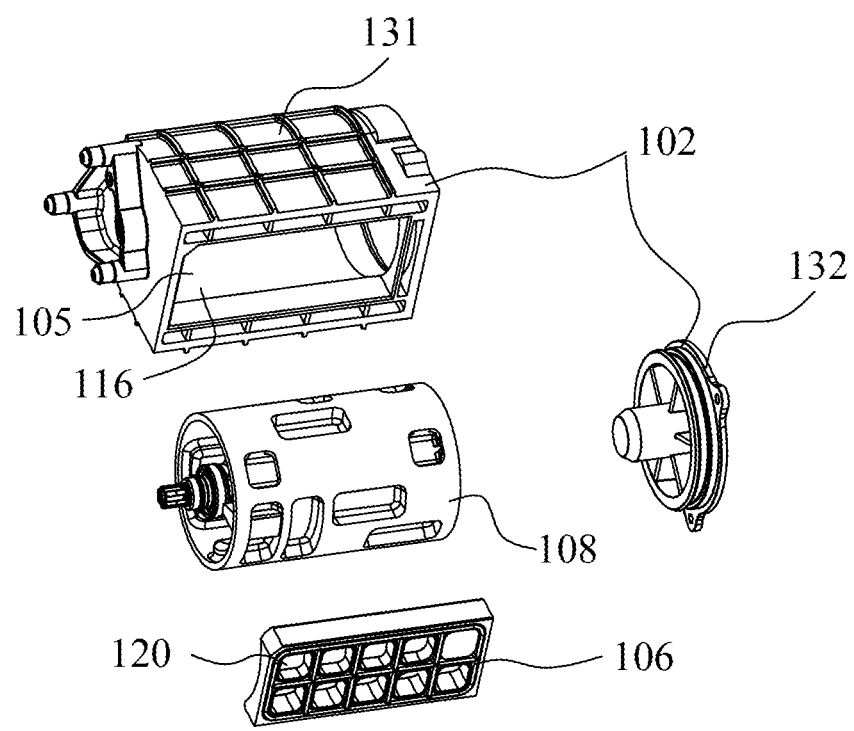
FIG. 1B is a perspective view of the multi-passage valve in FIG. 1A.

FIG. 1A is a perspective view of a multi-passage valve according to an embodiment of the present disclosure, and FIG. 1B is a perspective view of the multi-passage valve in FIG. 1A. As shown in FIGS. 1A and 1B, a valve 100 includes a housing 102, a valve element 108, and a sealing element 106. The housing 102 includes a housing body 131 and a housing cover 132. The housing 102 has a housing cavity 116 and a housing opening 105, the housing opening 105 is in communication with the housing cavity 116. The valve element 108 is located inside the housing cavity 116, and the sealing element 106 covers the housing opening 105. The sealing element 106 is provided with a plurality of openings 120, the plurality of openings 120 connecting corresponding pipelines in a thermal management system. The valve element 108 can rotate within the housing 102 to regulate a connecting relationship between the plurality of openings 120 for heat regulation.

Figure 2A:
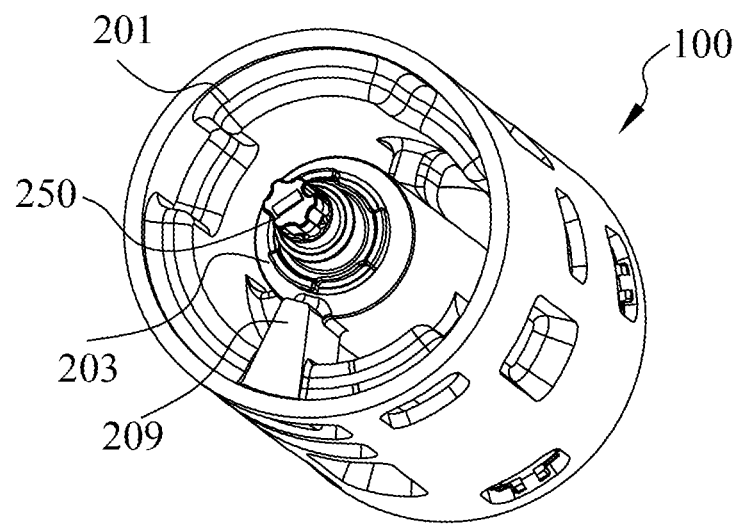
FIG. 2A is a perspective view of a valve element in FIG. 1B.
Figure 2B:
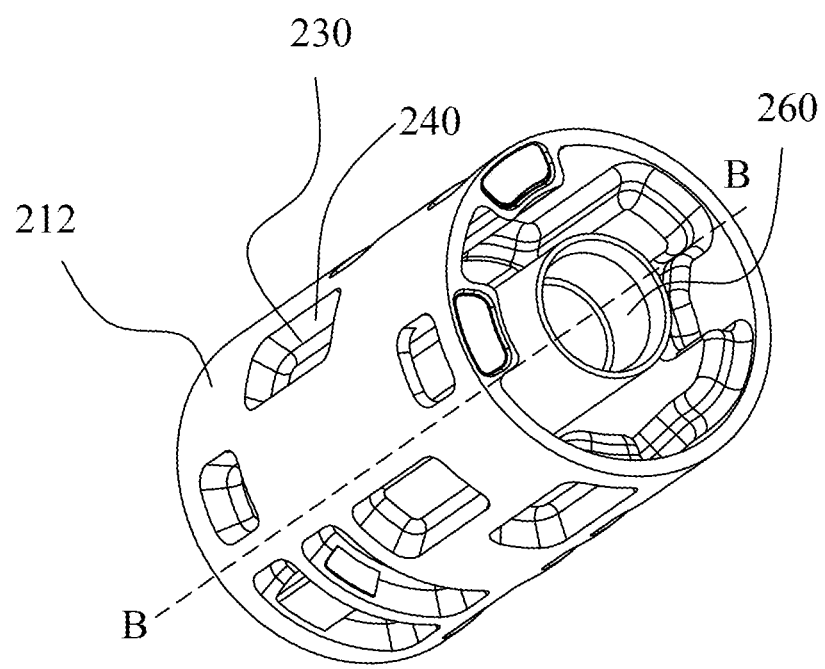
FIG. 2B is a perspective view of the valve element in FIG. 1A from another perspective.
Figure 2C:
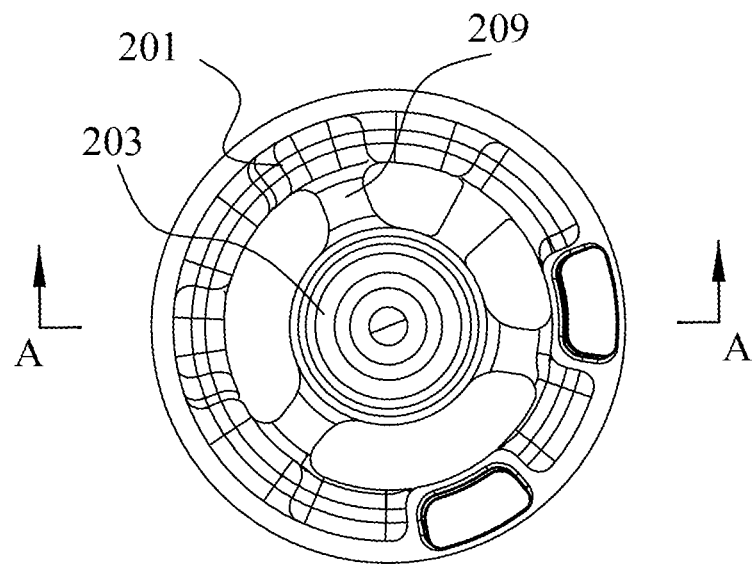
FIG. 2C is a bottom view of the valve element in FIG. 2A.
Figure 2D:
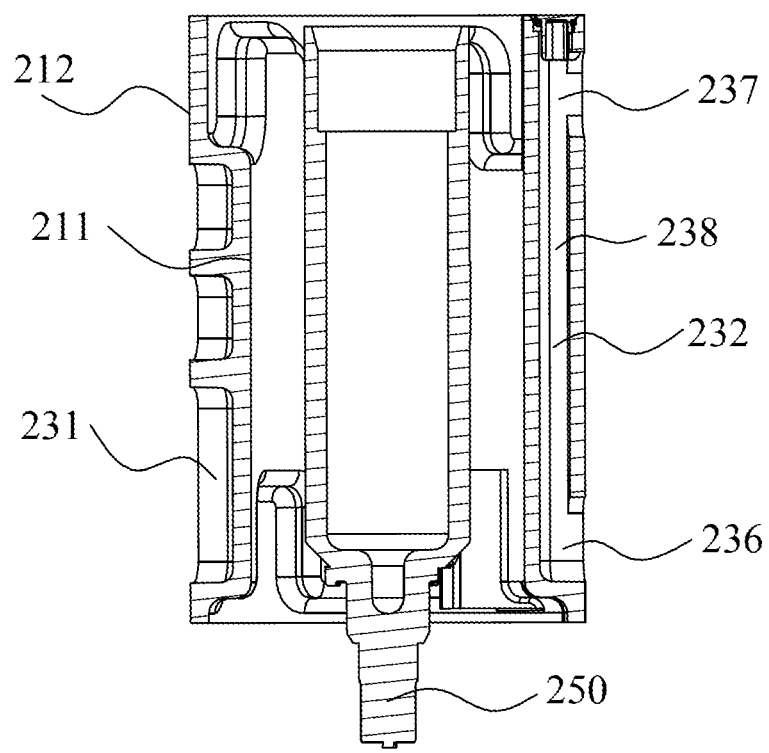
FIG. 2D is a cross-sectional view of the valve element taken along line A-A in FIG. 2C.

FIG. 2A is a perspective view of the valve element in FIG. 1B, FIG. 2B is a perspective view of the valve element in FIG. 1A from another perspective, FIG. 2C is a bottom view of the valve element in FIG. 2A, and FIG. 2D is a cross-sectional view of the valve element taken along line A-A in FIG. 2C. FIGS. 2A-2D show the structure of the valve element. As shown in FIGS. 2A and 2B, an outer contour of the valve element 108 is generally cylindrical. The valve element 108 generally includes a passage portion 201, a shaft portion 203, and a connecting portion 209. The passage portion 201 is generally in the shape of a hollow barrel and has a certain thickness. The passage portion 201 has a passage portion inner wall 211 and a passage portion outer wall 212. The outer wall of the passage portion 201 is provided with a plurality of passage openings 240. A plurality of slots 230 are provided in the passage portion 201, and each of the slots 230 can communicate with a corresponding passage opening 240, thereby forming a connecting passage. The connecting passage can communicate two or more of the plurality of openings 120 of the sealing element 106 with each other.

The slots 230 include strip-shaped slots 231 and U-shaped slots 232. The strip-shaped slots 231 each is formed by a recess being recessed inwardly from the passage opening 240 on the surface of the outer wall 212 of the passage portion 201. Each strip-shaped slot 231 corresponds to one passage opening, and the passage opening 240 corresponding to the strip-shaped slot 231 is an opening extending continuously on the outer wall 212 of the passage portion. That is, in an axial direction of the valve element 108, an extension length of the strip-shaped slot 231 is approximately equal to an extension length of the passage opening on the surface of the outer wall 212. The strip-shaped slot 231 is adapted to connect adjacent openings 120 of the sealing element 106. In the present disclosure, each of the strip-shaped slots refers to a slot which corresponds to one passage opening, that is, a slot formed by a recess, and the shape thereof is not limited to the shape of a strip. In an embodiment of the present disclosure, the U-shaped slots are used to connect two or more openings 120 of the sealing element 106 which are spaced far apart. The U-shaped slots 232 each is formed by a hollowed-out portion. The hollowed-out portion includes a first portion 236 and a second portion 237 recessed inwardly from two passage openings on the surface of the outer wall 212 of the passage portion, and a connecting part 238 located between the inner wall 211 and the outer wall 212 of the passage portion 201, the connecting part 238 being capable of communicating the first portion 236 with the second portion 237. In other embodiments, the U-shaped slot includes two or more than two passage openings which are disposed separately, so as to connect two or more than two openings 120. The U-shaped slot is adapted to connect two or more openings 120 which are spaced far apart.

The shaft portion 203 is located inside the passage portion 201 and is connected to the passage portion inner wall 211 by means of the connecting portion 209. One end of the shaft portion 203 extends beyond the passage portion 201 to form a projection 250, and the projection 250 can be connected to a power device (e.g., an actuator), so that the power device can drive the valve element 108 to rotate. The other end of the shaft portion 203 has a positioning fitting portion 260 formed by recessing inwardly for fitting with the cover 132.

In another embodiment of the present disclosure, the inner wall of the passage portion 201 is connected to an outer wall of the shaft portion 203 to form an integrated structure, with no connecting portion being provided.

Figure 3A:
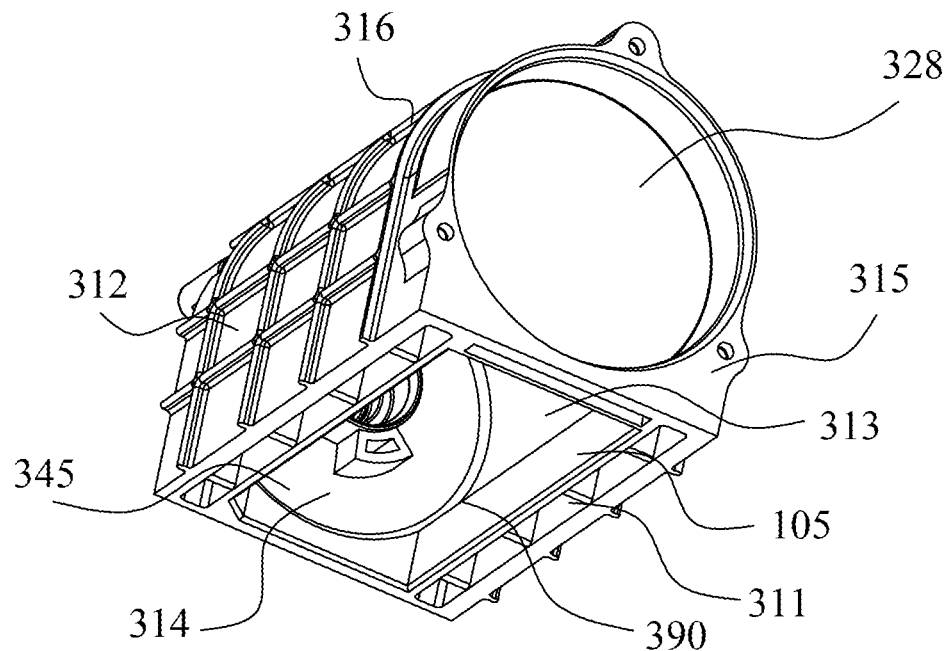
FIG. 3A is a perspective view of a housing body in FIG. 1B.
Figure 3B:
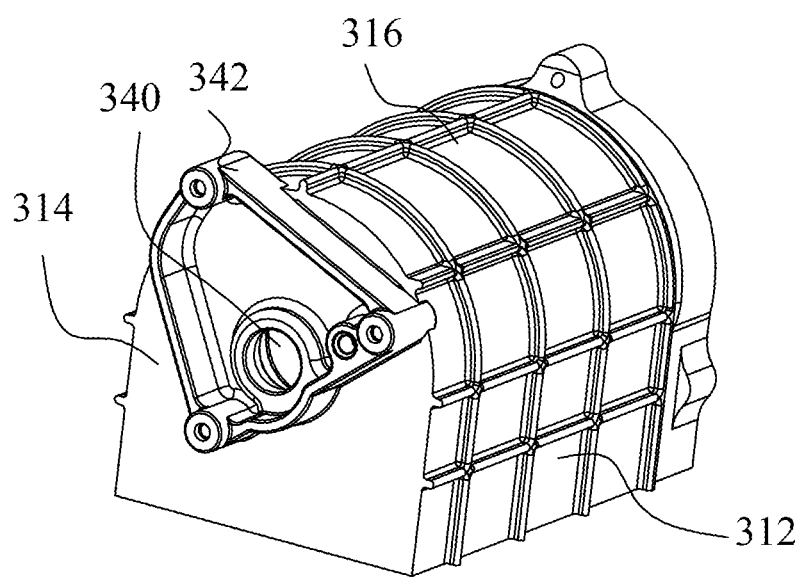
FIG. 3B is a perspective view of the housing body in FIG. 1A from another perspective.

FIG. 3A is a perspective view of the housing body in FIG. 1B, and FIG. 3B is a perspective view of the housing body in FIG. 1A from another perspective. As shown in FIGS. 3A and 3B, the housing body 131 has a communicating portion 390 for connection to the outside. The housing body 131 includes a bottom 311, a pair of side walls 312 and 313, a top 316, and a pair of end walls 314 and 315. The pair of side walls 312 and 313 extend upwardly from two side edges of the bottom 311 extending in a length direction, and the ends of the top 316 are connected to the pair of side walls 312 and 313. The pair of end walls 314 and 315 extend upwardly from two side edges of the bottom 311 extending in a width direction respectively, and are connected to the pair of side walls 312 and 313 and to the top 316. Thus, the housing 102 encloses the housing cavity 116.

The bottom 311 is provided with a housing opening 105, and the sealing element 106 can be mounted in the housing opening 105. The sealing element 106 abuts against edges of the housing opening 105, so that the sealing element 106 can be held in the housing opening 105. The housing opening 105 forms the communicating portion 390. The end wall 315 is provided with a valve element mounting opening 328, and the valve element 108 can be mounted into the housing cavity 116 through the valve element mounting opening 328. The end wall 314 is provided with a shaft mounting hole 340, and the projection 250 of the valve element 108 can pass through the shaft mounting hole 340 to be positioned outside the housing 102. The end wall 314 is also provided with a power device connecting portion 342. The power device is connected to the projection 250 and to the power device connecting portion 342.

Figure 4:
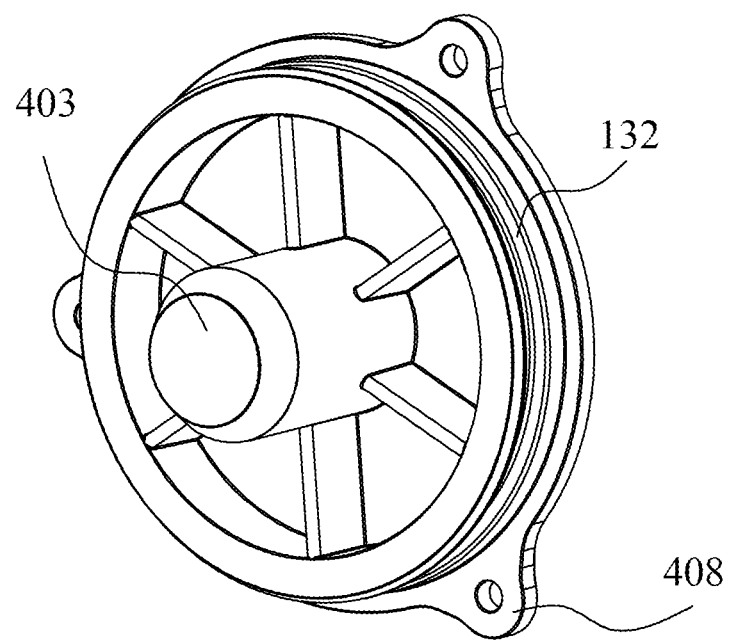
FIG. 4 is a perspective view of a housing cover.

FIG. 4 is a perspective view of the housing cover. As shown in FIG. 4, the housing cover 132 includes a positioning portion 403 formed by protruding from one side surface of the housing cover 132. The positioning portion 403 can enter the positioning fitting portion 260 of the valve element 108 to facilitate smooth rotation of the valve element 108. The housing cover 132 has a connecting portion 408, with the connecting portion 408 being provided with connecting holes, the cover 132 can be connected to the housing body 131 by means of connectors such as screws.

Figure 5A:
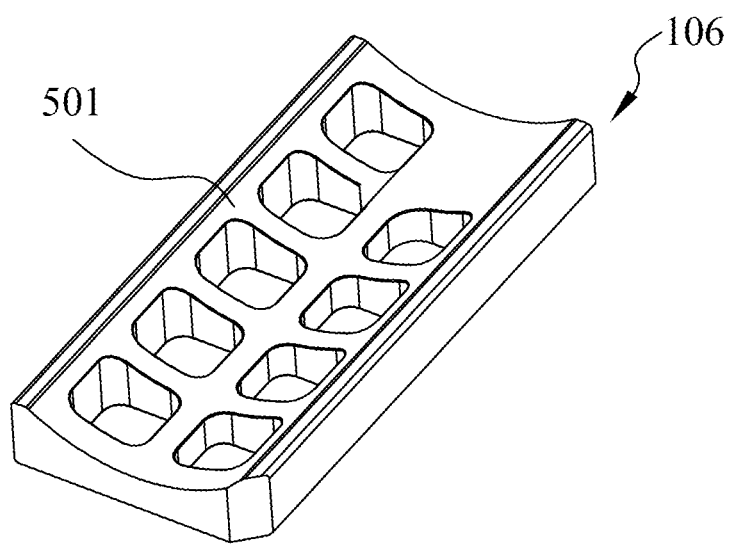
FIG. 5A is a perspective view of a sealing element in FIG. 1B.
Figure 5B:
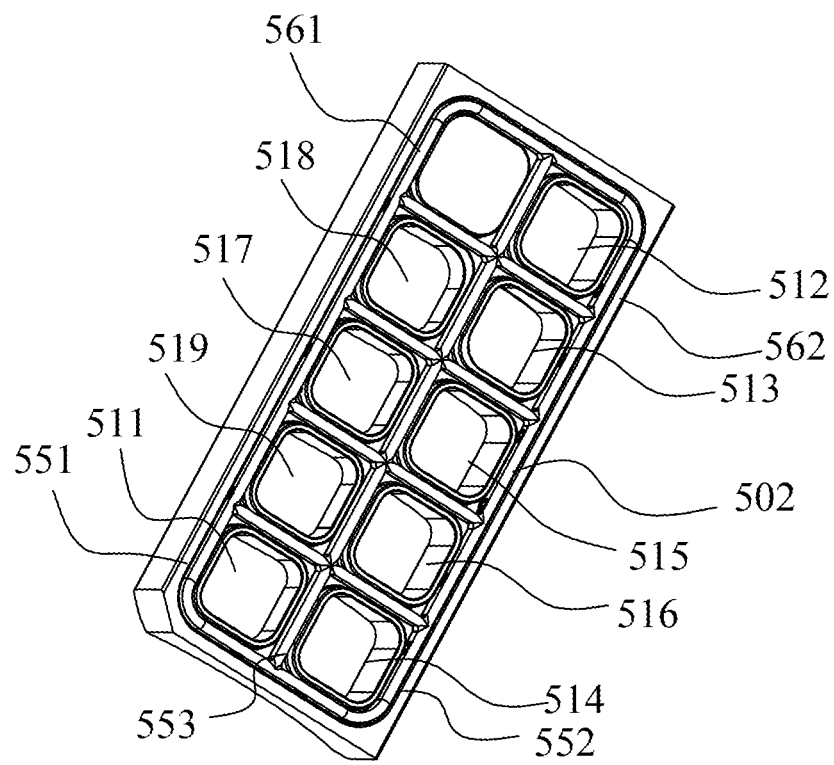
FIG. 5B is a perspective view of the sealing element in FIG. 5A from another perspective.

FIG. 5A is a perspective view of the sealing element in FIG. 1B, showing an inner surface of the sealing element, and FIG. 5B is a perspective view of the sealing element in FIG. 5A from another perspective, showing an outer surface of the sealing element. As shown in FIGS. 5A and 5B, the sealing element 106 is generally in the shape of a strip and has a length direction and a width direction, and a pair of length sides 561 and 562 extend in the length direction and are arranged in the axial direction of the valve element 108. The sealing element 106 includes an inner surface 501 facing the valve element 108 and an outer surface 502 facing away from the valve element 108.

The inner surface 501 of the sealing element 106 is generally an arc-shaped surface to fit the shape of the outer surface of the valve element 108, and the outer surface 502 of the sealing element 106 is generally a planar surface to fit a mounting position for the multi-passage valve 100. In an embodiment of the present disclosure, the multi-passage valve 100 is mounted on a housing of an integrated management device.

The sealing element 106 has a plurality of openings 120 extending through the inner surface 501 and the outer surface 502 of the sealing element. In an embodiment of the present disclosure, the number of openings is nine, i.e., a first opening 511, a second opening 512, a third opening 513, a fourth opening 514, a fifth opening 515, a sixth opening 516, a seventh opening 517, an eighth opening 518, and a ninth opening 519, respectively. Each opening is generally square. The plurality of openings are arranged in two rows each arranged along the length direction of the sealing element 106. The first row includes five openings, which are the second opening 512, the third opening 513, the fifth opening 515, the sixth opening 516, and the fourth opening 514, respectively. The second row includes four openings, which are the eighth opening 518, the seventh opening 517, the ninth opening 519, and the first opening 511, respectively. The first opening 511 and the fourth opening 514 are arranged side by side, the ninth opening 519 and the sixth opening 516 are arranged side by side, the seventh opening 517 and the fifth opening 515 are arranged side by side, the eighth opening 518 and the third opening 513 are arranged side by side, and the second opening 512 is arranged on a side of the third opening 513.

The sealing element has a first axial sealing portion 551 and a second axial sealing portion 552 on both sides thereof in the length direction, and a third axial sealing portion 553 is provided between the two rows of openings.

The sealing element 106 is made of a resilient material. The inner surface 501 of the sealing element 106 can form a seal with the valve element 108, and the outer surface 502 of the sealing element 106 can form a seal with the mounting position for the multi-passage valve 100. In the present disclosure, the sealing element 106 surrounds only a part of the valve element 108 in a circumferential direction. Such an arrangement can reduce a friction force between the valve element 108 and the sealing element 106 when the valve element rotates.

In an embodiment of the present disclosure, the sealing element 106 has an arc length in the circumferential direction of the valve element 108 that does not exceed a total arc length of two adjacent regions of the valve element 108, i.e., the sealing element 106 has an extension in the circumferential direction of the valve element 108 that does not exceed an extension of the two adjacent regions of the valve element 108.

In an embodiment of the present disclosure, the inner surface 501 of the sealing element 106 has an arc length in the circumferential direction that does not exceed ¼ of the circumference in which the sealing element is located.

Figure 6:
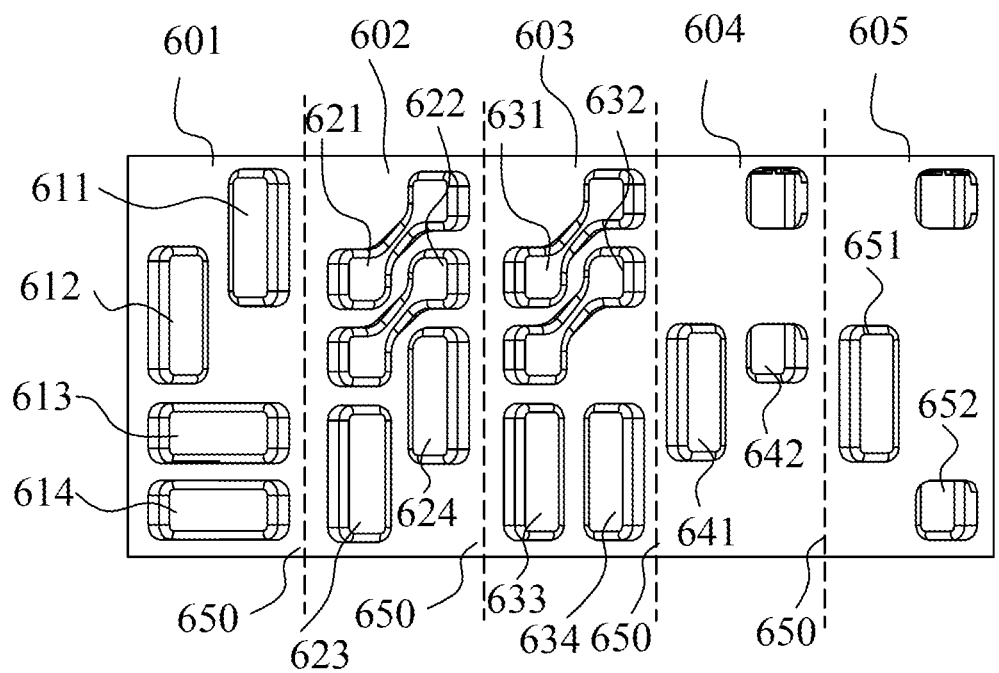
FIG. 6 is a schematic diagram of the valve element in FIG. 2B unfolded along line B-B.

FIG. 6 is a schematic diagram of the valve element in FIG. 2B unfolded along line B-B. As shown in FIG. 6B, in the circumferential direction, the valve element 108 is divided into five regions, which are a first region 601, a second region 602, a third region 603, a fourth region 604, and a fifth region 605, respectively. Each region has connecting passages formed by corresponding slots to connect different openings. Between adjacent regions there is a separation portion 650 extending in a axial direction of the valve element 108. The separation portion 650 extends continuously in the axial direction, so that the separation portion 650 makes the connecting passages between the adjacent regions cannot communicate with each other. The separation portions 650 can be in contact with the first axial sealing portion 551 and the second axial sealing portion 552 to form seals with the first axial sealing portion 551 and the second axial sealing portion 552, so that fluid in a corresponding region cannot enter into other regions when the valve element 108 is aligned with the corresponding region. When a corresponding region of the five regions of the valve element 108 is aligned with the sealing element 106, the region becomes an operating region, and the other regions are not involved in the operation. By aligning the operating region with the sealing element 106, the multi-passage valve 100 achieves a specific connecting relationship, such that the thermal management system connected to the multi-passage valve 100 enters a corresponding operating mode.

As shown in FIG. 6, the first region 601 is provided with a first connecting passage 611, a second connecting passage 612, a third connecting passage 613, and a fourth connecting passage 614. Each of the first connecting passage 611, the second connecting passage 612, the third connecting passage 613, and the fourth connecting passage 614 is formed by a strip-shaped slot. The first connecting passage 611 can connect the second opening 512 to the third opening 513, the second connecting passage 612 can connect the seventh opening 517 to the eighth opening 518, the third connecting passage 613 can connect the sixth opening 516 to the ninth opening 519, and the fourth connecting passage 614 can connect the first opening 511 to the fourth opening 514.

The second region 602 is provided with a fifth connecting passage 621, a sixth connecting passage 622, a seventh connecting passage 623, and an eighth connecting passage 624. Each of the fifth connecting passage 621, the sixth connecting passage 622, the seventh connecting passage 623, and the eighth connecting passage 624 is formed by a strip-shaped slot. The fifth connecting passage 621 can connect the second opening 512 to the eighth opening 518. The sixth connecting passage 622 can connect the third opening 513 to the seventh opening 517, the seventh connecting passage 623 can connect the first opening 511 to the ninth opening 519, and the eighth connecting passage 624 can connect the fifth opening 515 to the sixth opening 516.

The third region 603 is provided with a ninth connecting passage 631, a tenth connecting passage 632, an eleventh connecting passage 633, and a twelfth connecting passage 634. Each of the ninth connecting passage 631, the tenth connecting passage 632, the eleventh connecting passage 633, and the twelfth connecting passage 634 is formed by a strip-shaped slot. The ninth connecting passage 631 can connect the second opening 512 to the eighth opening 518. The tenth connecting passage 632 can connect the third opening 513 to the seventh opening 517, the eleventh connecting passage 633 can connect the first opening 511 to the ninth opening 519, and the twelfth connecting passage 634 can connect the fourth opening 514 to the sixth opening 516.

The fourth region 604 is provided with a thirteenth connecting passage 641 and a fourteenth connecting passage 642, wherein the thirteenth connecting passage 641 is formed by a strip-shaped slot, and the fourteenth connecting passage 642 is formed by a U-shaped slot. The thirteenth connecting passage 641 can connect the seventh opening 517 to the ninth opening 519. The fourteenth connecting passage 642 can connect the fifth opening 515 to the second opening 512.

The fifth region 605 is provided with a fifteenth connecting passage 651 and a sixteenth connecting passage 652, wherein the fifteenth connecting passage 651 is formed by a strip-shaped slot, and the sixteenth connecting passage 652 is formed by a U-shaped slot. The fifteenth connecting passage 651 can connect the seventh opening 517 to the ninth opening 519. The sixteenth connecting passage 652 can connect the fourth opening 514 to the second opening 512.

Figure 7:
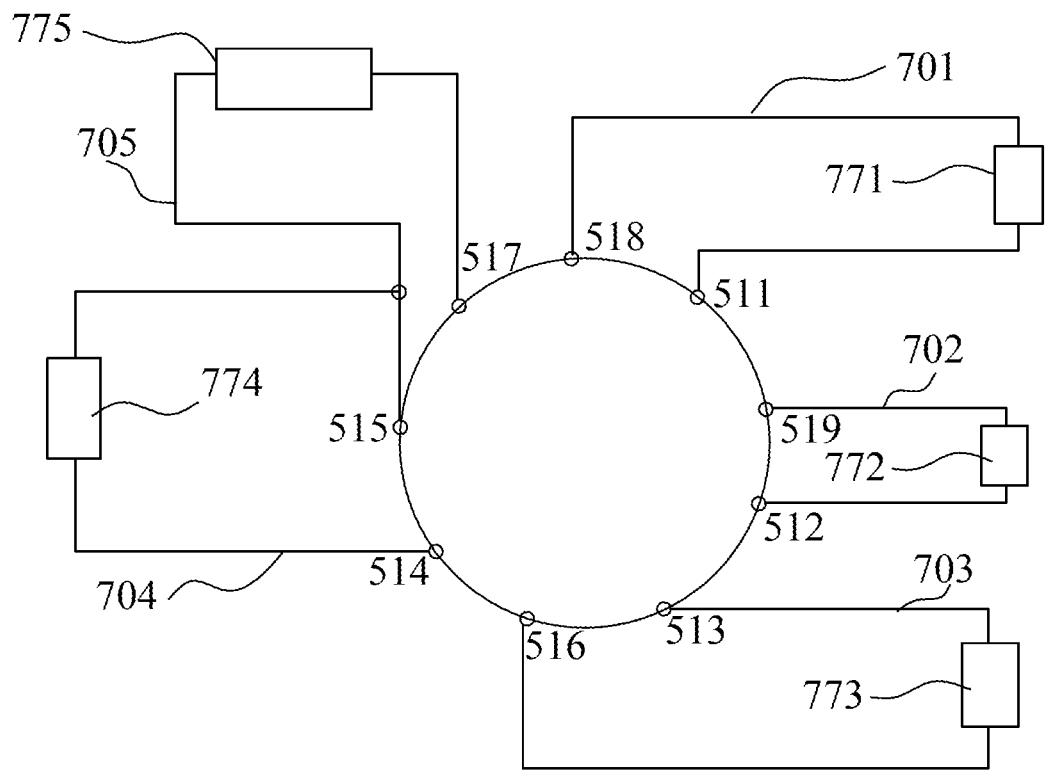
FIG. 7 is a schematic diagram of the multi-passage valve shown in FIG. 1A and external pipelines connected thereto.

FIG. 7 is a schematic diagram of the multi-passage valve shown in FIG. 1A and external pipelines connected thereto. As shown in FIG. 7, two ends of a first operating path 701 are connected to the first opening 511 and the eighth opening 518, two ends of a second operating path 702 are connected to the ninth opening 519 and the second opening 512, two ends of a third operating path 703 are connected to the sixth opening 516 and the third opening 513, two ends of a fourth operating path 704 are connected to the fourth opening 514 and the fifth opening 515, one end of a fifth operating path 705 is connected to the seventh opening 517, and the other end of the fifth operating path is connected to the fourth operating path 704. The first operating path 701, the second operating path 702, the third operating path 703, the fourth operating path 704, and the fifth operating path 705 are respectively connected to external apparatuses 771, 772, 773, 774 and 775, such as power apparatus, battery apparatus, heat dissipation apparatus, refrigeration apparatus, and heat exchanger. The rotation of the valve element 108 in the housing 102 enables regulation of the connecting relationship between the openings, thereby regulating the connecting relationship between the operating paths, so as to achieve heat management.

Figure 8A:
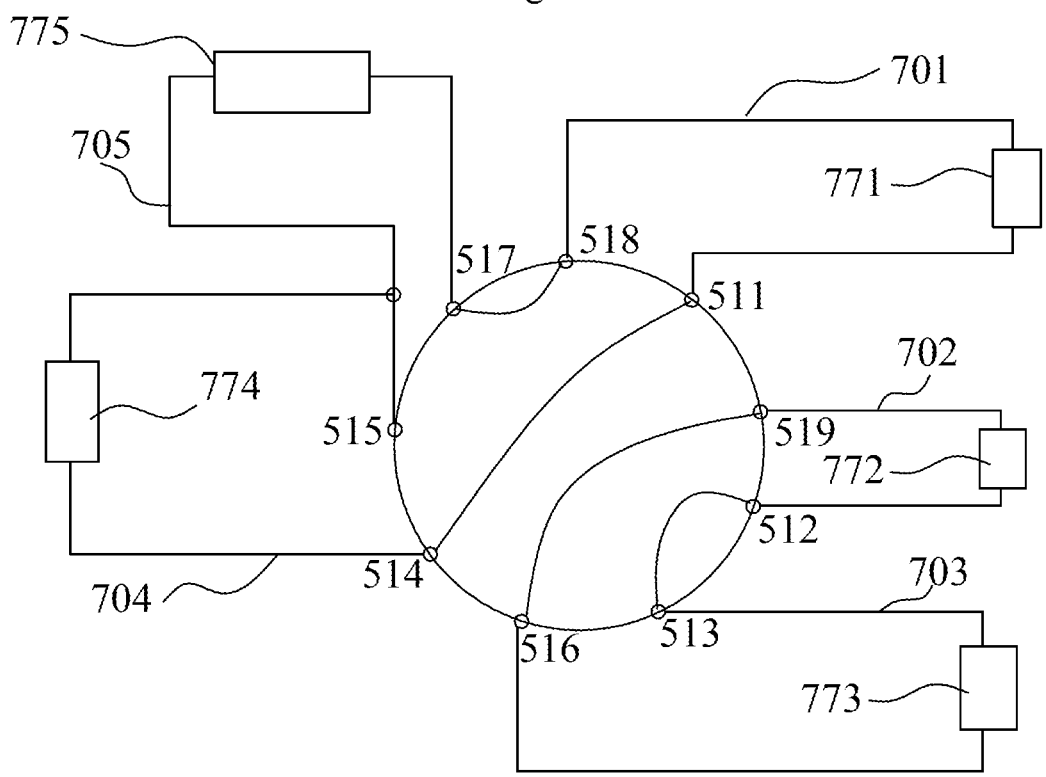
FIG. 8A is a schematic diagram of connections of the multi-passage valve shown in FIG. 1A in a first operating mode.

FIG. 8A is a schematic diagram of connections of the multi-passage valve shown in FIG. 1A in a first operating mode. When the valve element 108 is rotated such that the sealing element 106 is aligned with the first region 601, the multi-passage valve is in the first operating mode. As shown in FIG. 8A, in the first operating mode, the seventh opening 517 is connected to the eighth opening 518, the first opening 511 is connected to the fourth opening 514, the ninth opening 519 is connected to the sixth opening 516, and the second opening 512 is connected to the third opening 513. Thus, the first operating path 701, the fourth operating path 704, and the fifth operating path 705 are connected in series, and a cooling fluid can circulate in a direction of the first operating path 701, the fourth operating path 704, and the fifth operating path 705. The second operating path 702 and the third operating path 703 are connected in series, and the cooling fluid can circulate in a direction of the second operating path 702 and the third operating path 703.

Figure 8B:
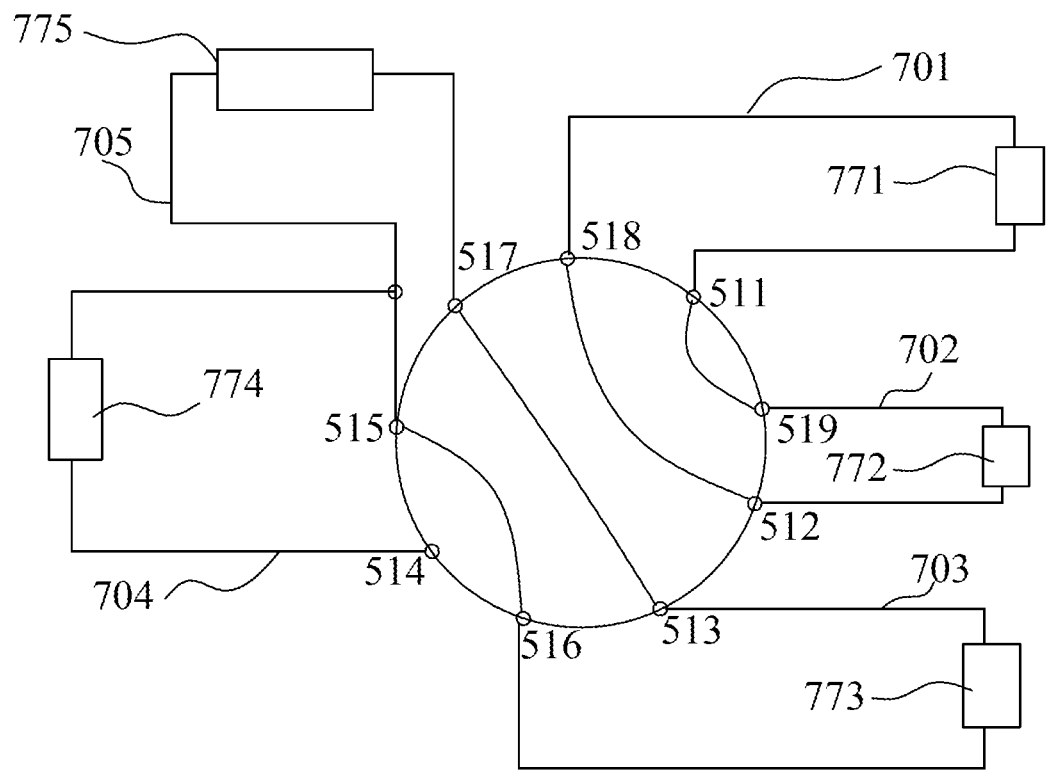
FIG. 8B is a schematic diagram of connections of the multi-passage valve shown in FIG. 1A in a second operating mode.

FIG. 8B is a schematic diagram of connections of the multi-passage valve shown in FIG. 1A in a second operating mode. When the valve element 108 is rotated such that the sealing element 106 is aligned with the second region 602, the multi-passage valve is in a second operating mode. As shown in FIG. 8B, in the second operating mode, the second opening 512 is connected to the eighth opening 518, the third opening 513 is connected to the seventh opening 517, the sixth opening 516 is connected to the fifth opening 515, and the first opening 511 is connected to the ninth opening 519. Thus, the first operating path 701 and the second operating path 702 are connected in series, and the cooling fluid can circulate in a direction of the first operating path 701 and the second operating path 702. The third operating path 703 and the fifth operating path 705 are connected in series, and the cooling fluid can circulate in a direction of the third operating path 703 and the fifth operating path 705.

Figure 8C:
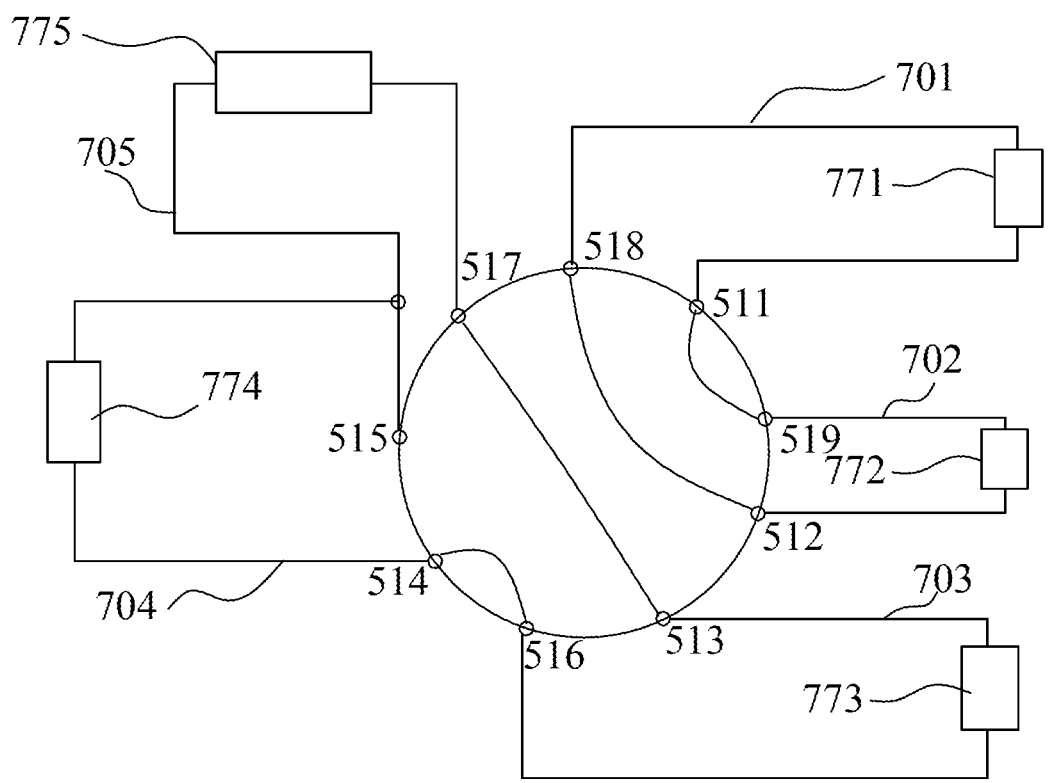
FIG. 8C is a schematic diagram of connections of the multi-passage valve shown in FIG. 1A in a third operating mode.

FIG. 8C is a schematic diagram of connections of the multi-passage valve shown in FIG. 1A in a third operating mode. When the valve element 108 is rotated such that the sealing element 106 is aligned with the third region 603, the multi-passage valve is in the third operating mode. As shown in FIG. 8C, in the third operating mode, the second opening 512 is connected to the eighth opening 518, the third opening 513 is connected to the seventh opening 517, the sixth opening 516 is connected to the fourth opening 514, and the first opening 511 is connected to the ninth opening 519. Thus, the first operating path 701 and the second operating path 702 are connected in series, and the cooling fluid can circulate in a direction of the first operating path 701 and the second operating path 702. The third operating path 703, the fourth operating path 704, and the fifth operating path 705 are connected in series, and the cooling fluid can circulate in a direction of the third operating path 703, the fourth operating path 704, and the fifth operating path 705.

Figure 8D:
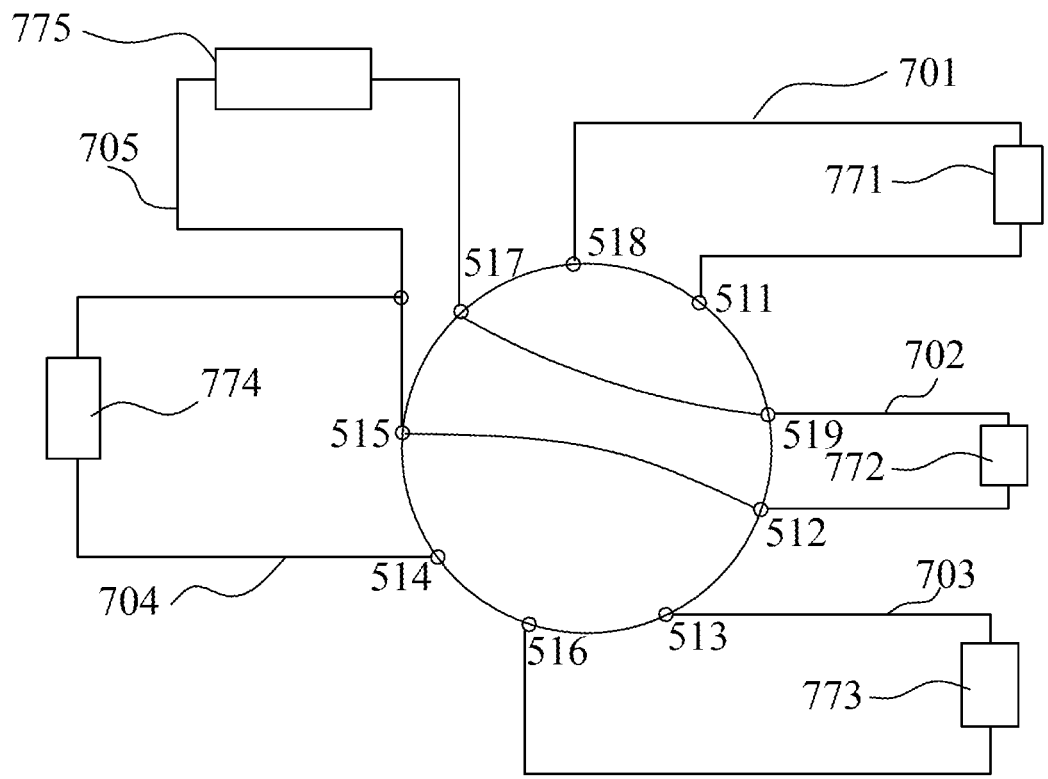
FIG. 8D is a schematic diagram of connections of the multi-passage valve shown in FIG. 1A in a fourth operating mode.

FIG. 8D is a schematic diagram of connections of the multi-passage valve shown in FIG. 1A in a fourth operating mode. When the valve element 108 is rotated such that the sealing element 106 is aligned with the fourth region 604, the multi-passage valve is in the fourth operating mode. As shown in FIG. 8D, in the fourth operating mode, the second opening 512 is connected to the fifth opening 515, and the seventh opening 517 is connected to the ninth opening 519. Thus, the second operating path 702 and the fifth operating path 705 are connected in series, and the cooling fluid can circulate in a direction of the second operating path 702 and the fifth operating path 705.

Figure 8E:
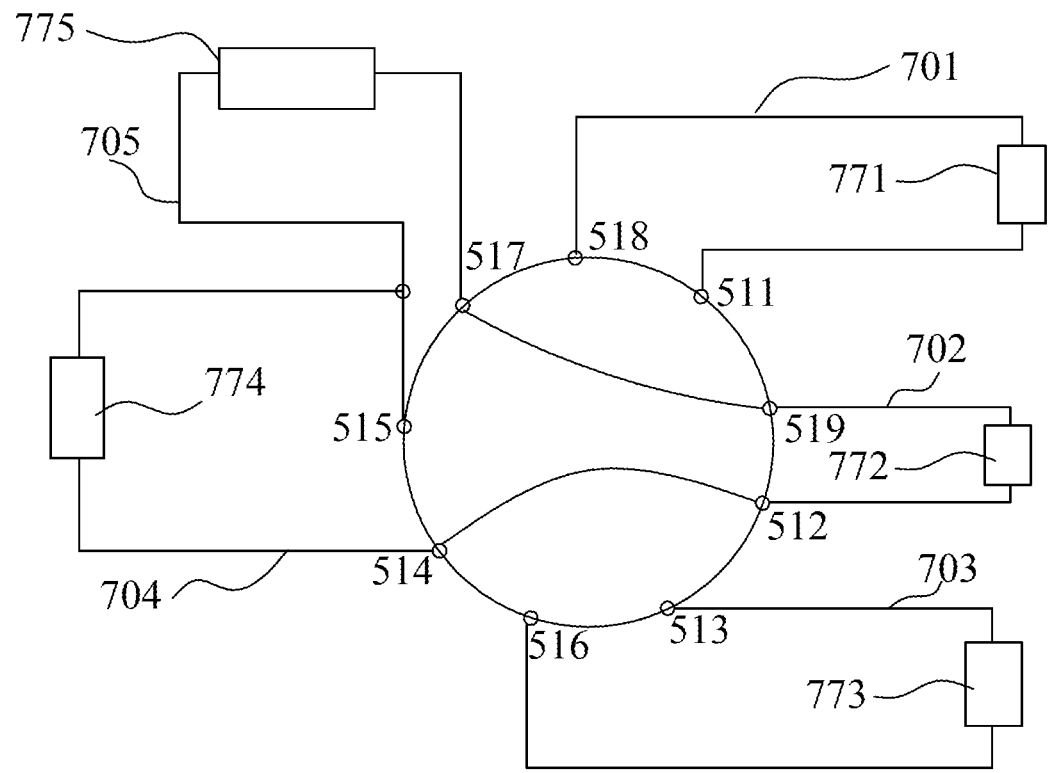
FIG. 8E is a schematic diagram of connections of the multi-passage valve shown in FIG. 1A in a fifth operating mode.

FIG. 8E is a schematic diagram of connections of the multi-passage valve shown in FIG. 1A in a fifth operating mode. When the valve element 108 is rotated such that the sealing element 106 is aligned with the fifth region 605, the multi-passage valve is in the fifth operating mode. As shown in FIG. 8E, in the fifth operating mode, the second opening 512 is connected to the fourth opening 514, and the seventh opening 517 is connected to the ninth opening 519. Thus, the second operating path 702, the fourth operating path 704, and the fifth operating path 705 are connected in series, and the cooling fluid can circulate in a direction of the second operating path 702, the fourth operating path 704, and the fifth operating path 705.

When the multi-passage valve reaches a desired position for each operating mode, the sealing element is required to be compressed against the outer wall of the valve element and apply a compressing force thereto to ensure the tightness of each passage. However, the compressing contact between the sealing element and the outer wall of the valve element will cause a frictional resistance, and the rotation of the valve element needs to overcome the frictional resistance brought about by the sealing element. The smaller a contact area between the valve element and the sealing element is, the smaller the friction resistance will be.

In the present disclosure, the sealing element is in contact with only a part of the valve element in the circumferential direction, and the contact area between the sealing element and the valve element is small, so that the resistance to the rotation of the valve element is small.

The connecting passages of the multi-passage valve in the present disclosure are arranged such that each connecting passage corresponds to only one operating mode, and when switched to a specific mode, there will be no case in which a part of the connecting passages is aligned with the sealing element and the other part thereof is staggered with the sealing element. Thus, when the multi-passage valve is rotated to a corresponding operating position, the fluid in the connecting passage of the valve element is sealed by the sealing element, and cannot flow from the connecting passage to the region not covered by the sealing element. Therefore, the sealing element in the present disclosure only needs to cover a region corresponding to a corresponding operating mode in the circumferential direction of the valve element, and does not need to cover other regions, so that the contact area between the sealing element and the valve element is small.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Furthermore, the technical effects and/or technical problems described in this description are exemplary rather than limiting; therefore, the disclosure in this description may have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to encompass all known or earlier disclosed alternatives, modifications, variations, improvements, and/or substantial equivalents.

What is claimed is:

1. A multi-passage valve, comprising:
a housing defining a housing cavity, the housing being provided with a communicating portion for connecting the housing cavity to the outside;
a valve element rotatably disposed inside the housing cavity around an axis, the valve element having at least two regions on an outer side thereof, the at least two regions being arranged in a direction of rotation of the valve element, each of the regions extending in an axial direction of the valve element and having a plurality of connecting passages; and
a sealing element disposed at the communicating portion of the housing, the sealing element extending by a distance around the valve element and keeping in contact with an outer surface of the valve element, and the sealing element being provided with a plurality of openings communicating with the outside through the communicating portion;
wherein one of the at least two regions is capable of being covered by the sealing element by means of rotating the valve element to form an operating region, each of the plurality of connecting passages in the operating region being capable of connecting at least two of the plurality of openings;
wherein an inner surface of the sealing element has an arc length in a circumferential direction of the valve element that does not exceed one quarter of a circumference of the valve element; and
wherein the communicating portion includes an opening in a wall of the housing in which the sealing element is disposed.

2. The multi-passage valve of claim 1,
wherein the multi-passage valve has at least two operating modes, and is capable of switching between different operating modes by selecting a different region of the at least two regions of the valve element as the operating region, and
wherein each of the plurality of connecting passages of the valve element is applied to the operating region in only one operating mode, and each of the plurality of connecting passages is disposed separately from other connecting passages.

3. A multi-passage valve, comprising:
a housing defining a housing cavity, the housing being provided with a communicating portion for connecting the housing cavity to the outside;
a valve element rotatably disposed inside the housing cavity around an axis, the valve element having at least two regions on an outer side thereof, the at least two regions being arranged in a direction of rotation of the valve element, each of the regions extending in an axial direction of the valve element and having a plurality of connecting passages; and a sealing element disposed at the communicating portion of the housing, the sealing element extending by a distance around the valve element and keeping in contact with an outer surface of the valve element, and the sealing element being provided with a plurality of openings communicating with the outside through the communicating portion;

wherein one of the at least two regions is capable of being covered by the sealing element by means of rotating the valve element to form an operating region, each of the plurality of connecting passages in the operating region being capable of connecting at least two of the plurality of openings;

wherein at least one of the plurality of connecting passages of the valve element is formed by a recessed portion that extends only partially through a wall of the valve element; and wherein the communicating portion includes an opening in a wall of the housing in which the sealing element is disposed.

4. The multi-passage valve of claim 3, wherein the recessed portion is a strip-shaped slot.

5. The multi-passage valve of claim 3, wherein the recessed portion defines a first portion and a second portion, each of the first and second portions being recessed inwardly from openings on a surface of the wall and connected fluidically by a connecting part formed within the wall.

6. A multi-passage valve, comprising:
a housing defining a housing cavity, the housing being provided with a communicating portion for connecting the housing cavity to the outside;
a valve element rotatably disposed inside the housing cavity around an axis, the valve element having at least two regions on an outer side thereof, the at least two regions being arranged in a direction of rotation of the valve element, each of the regions extending in an axial direction of the valve element and having a plurality of connecting passages; and
a sealing element disposed at the communicating portion of the housing, the sealing element extending by a distance around the valve element and keeping in contact with an outer surface of the valve element, and the sealing element being provided with a plurality of openings communicating with the outside through the communicating portion;

wherein one of the at least two regions is capable of being covered by the sealing element by means of rotating the valve element to form an operating region, each of the plurality of connecting passages in the operating region being capable of connecting at least two of the plurality of openings;

wherein the operating region is associated with an operating mode of a plurality of operating modes of the multi-passage valve;

wherein each of the plurality of connecting passages of the valve element is applied to the operating region in only one respective operating mode of the plurality of operating modes;

wherein each of the plurality of connecting passages is disposed separately from other connecting passages; and wherein the communicating portion includes an opening in a wall of the housing in which the sealing element is disposed.

7. The multi-passage valve of claim 6, wherein the multi-passage valve has at least two operating modes, and is capable of switching between different operating modes by selecting a different region of the at least two regions of the valve element as the operating region.

8. The multi-passage valve of claim 6, wherein an outer contour of the valve element is cylindrical, wherein the at least two regions are arranged in a circumferential direction of the valve element, and each of the regions is uniformly distributed in the circumferential direction.

9. The multi-passage valve of claim 8, wherein an extension of the sealing element in the circumferential direction of the valve element does not exceed an extension of two adjacent regions; and the sealing element is generally in a shape of a strip and has a pair of length sides, the pair of length sides being arranged in the axial direction of the valve element.

10. The multi-passage valve of claim 6, wherein the sealing element has a first axial sealing portion and a second axial sealing portion, and a separation portion is provided between adjacent regions of the at least two regions of the valve element, the separation portion being capable of being abutted with the first axial sealing portion and the second axial sealing portion.

11. The multi-passage valve of claim 6, wherein each of the plurality of connecting passages of the valve element is formed by a recess or a hollowed-out portion.

12. The multi-passage valve of claim 6, wherein the multi-passage valve is used for a thermal management system of a vehicle.

13. The multi-passage valve of claim 6, wherein:
the at least two regions comprise a first region and a second region; and
a first arrangement of connecting passages of the first region differs from a second arrangement of connecting passages of the second region.

14. The multi-passage valve of claim 13, wherein:
when the first region forms a first connecting relationship with at least some of the plurality of openings of the sealing element, the first arrangement of connecting passages is configured to form one or more first operating paths with the plurality of openings of the sealing element;
when the second region forms a second connecting relationship with at least some of the plurality of openings of the sealing element, the second arrangement of connecting passages is configured to form one or more second operating paths with the plurality of openings of the sealing element; and
at least one of the first operating paths differs from at least one of the second operating paths.

15. The multi-passage valve of claim 13, wherein the first region and the second region are positioned about the outer side of the valve element such that:
when the first region forms a first connecting relationship with at least some of the plurality of openings of the sealing element, at least one first separation portion separating the first region from the second region forms a first sealing relationship with at least one or more sealing portions of the sealing element, the first sealing relationship being configured to seal the plurality of connecting passages of the second region from the plurality of openings of the sealing element; and
when the second region forms a second connecting relationship with at least some of the plurality of openings of the sealing element, at least one second separation portion separating the second region from the first region forms a second sealing relationship with at least one of the one or more sealing portions of the sealing element, the second sealing relationship being configured to seal the plurality of connecting passages of the first region from the plurality of openings of the sealing element.

16. The multi-passage valve of claim 6, wherein:
rotation of the valve element selects the operating region from the at least two regions;
selecting the operating region forms an operating connecting relationship between the operating region and at least some of the plurality of openings of the sealing element, the operating connecting relationship being selected from a plurality of connecting relationships;
each connecting relationship of the plurality of connecting relationships is a coupling of at least some openings of the plurality of openings of the sealing element to the plurality of connecting passages of a respective region of the at least two regions.

17. The multi-passage valve of claim 16, wherein:
each region of the at least two regions is separated from every other region of the at least two regions by at least one separation portion of a plurality of separation portions; and
when the valve element forms the operating connecting relationship with the operating region of the at least two regions, at least two separation portions of the plurality of separation portions form a sealing relationship with at least one of one or more sealing portions of the sealing element, the sealing relationship being configured to seal the plurality of connecting passages of each region of at least two regions besides the operating region from the plurality of openings of the sealing element.

18. The multi-passage valve of claim 6, wherein at least one connecting passage of at least one region of the at least two regions is formed by a hollowed-out portion, the hollowed-out portion comprising:
a first portion recessed inwardly from a first passage opening on the outer side of the valve element;
a second portion recessed inwardly from a second passage opening on the outer side of the valve element; and
a connecting part located between an inner wall and an outer wall of a passage portion of the valve element, the connecting part being configured to communicate the first portion of the hollowed-out portion and the second portion of the hollowed-out portion.

\* \* \* \* \*